United States Patent [19]

Blonder

[11] Patent Number: 4,932,745
[45] Date of Patent: Jun. 12, 1990

[54] RADIATION SWITCHING ARRANGEMENT WITH MOVING DEFLECTING ELEMENT

[75] Inventor: Greg E. Blonder, Summit, N.J.

[73] Assignee: AT&T Bell Laboratories, Murray Hill, N.J.

[21] Appl. No.: 385,331

[22] Filed: Jul. 25, 1989

[51] Int. Cl.⁵ .................................................. G02B 6/36
[52] U.S. Cl. .............................. 350/96.20; 350/96.16; 350/96.18
[58] Field of Search ............... 350/96.15, 96.16, 96.18, 350/96.20, 96.21, 96.22

[56] References Cited

U.S. PATENT DOCUMENTS

| | | | |
|---|---|---|---|
| 3,870,396 | 3/1975 | Racki et al. | 350/96.16 |
| 3,874,779 | 4/1975 | Thiel | 350/96.16 |
| 4,239,331 | 12/1980 | Aoyama | 350/96.20 |
| 4,497,536 | 2/1985 | Payne et al. | 350/96.18 X |
| 4,580,873 | 4/1986 | Levinson | 350/96.20 |
| 4,789,228 | 12/1988 | Le Pesant et al. | 350/96.2 D X |

OTHER PUBLICATIONS

*Optics Letters*, vol. 4, No. 1, Jan. 1979, "Optical Switch For Multimode Optical-Fiber Systems", by Masahiro Nunoshita, Yoshinori Nomura, Teruhito Matsui and Takashi Nakayama, pp. 27-28.

*Electro-Optic Products*-Siecor Corporation, Application Note 102, "Moving Fiber" Switches Permit Greater System Predictability and Reliability, 7 pages, no date.

Primary Examiner—John D. Lee
Attorney, Agent, or Firm—David I. Caplan

[57] ABSTRACT

A three or four-port electromagnetic radiation signal beam switching arrangement, such as for simple optical re-routing or for Local Area Network (LAN) loop switching, is achieved with a moving deflecting element having a planar deflecting surface that is constrained to move parallel to itself, into and out of the signal beam. The arrangement can be fabricated in a silicon optical workbench technology.

19 Claims, 14 Drawing Sheets

RADIATION SWITCHING ARRANGEMENT WITH MOVING DEFLECTING ELEMENT

TECHNICAL FIELD

This invention relates to the field of the switching of beams of electromagnetic radiation and more particularly to arrangements for the switching of optical beams by switching the output of one optical port selectively into either one of a pair of other optical ports, where each port is typically either an exit or an entry end of an optical fiber (optical waveguide).

BACKGROUND OF THE INVENTION

In telecommunication or other systems using electromagnetic radiation signal beams, it is often desirable to switch a beam of electromagnetic radiation arriving at an input optical port selectively into either one of a pair of output ports—for example, to switch an optical signal beam arriving at the output end of an input optical fiber selectively into either one of a pair of exit opticals fibers depending upon a switching control signal at any moment of time. More specifically, in a telecommunication switching system, it is often desired to reroute an optical communication path—that is, to switch an optical path (IA), running from a given input fiber (I) to a first output optical fiber (A), into a second path (IB), running from the input fiber (I) to a second output optical fiber (B), and to switch the second path (IB) back into the first path (IA).

For another example, a local area network (LAN) typically includes a main computer station (M) and an optical fiber LAN loop (ring) composed of fiber segments arranged in a loop, together with local stations (X,Y,Z. . .) located at the junctions of successive fiber segments. Each of the local stations typically comprises a separate local personal computer or the like. Optical switching arrangements are required to bypass local stations that are defective or to bypass all local stations in cases where a defect in the loop itself occurs.

Prior art is exemplified by the optical switching arrangement described in a paper by M. Nunoshita et al, published in *Optics Letters*, vol. 4, No. 1, pp. 27-28 (1979). In that paper, optical switches for the above-described purposes employed a moving lens to switch the optical paths. But such switches are very clumsy and costly, primarily because of the need to move relatively heavy piece parts rather quickly. Moreover, the conventional machine-made parts required for these switches lack sufficient precision of optical alignment to be used in conjunction with optical fibers unless undesirably costly and time-consuming alignment procedures for each switch are performed. Furthermore, long-term stability and reliability are problematical because of aging phenomena associated with parts having differing mechanical and thermal properties. In addition, these switches do not enable temporarily non-accessed (off-line) local stations in a LAN to perform desired self-testing operations in conjunction with the local optical source, unless extra added complexity is introduced: for example, an the added complexity of extra fiber, which can be added as described in *Electro-Optic Products*, Application Note 102, FIG. 4 therein, published by Siecor Corp., Research Triangle Park, N. C. 27709. Furthermore, in the switches described in that Siecor publication, mechanical stops are required, which tend to wear out in use and which cause the optical components to vibrate immediately after switchings in such a direction as to jitter the beam undesirably.

It would therefore be desirable to have an optical signal switching arrangement, and more generally an electromagnetic signal switching arrangement, which mitigates the above shortcomings in the prior art.

SUMMARY OF THE INVENTION

The foregoing shortcomings are mitigated by an electromagnetic radiation switching arrangement which comprises:

(a) a radiation deflecting element (e.g., M, FIG. 2; RS, FIG. 18) having a planar deflecting surface;

(b) moving means (e.g., G; FIG. 4) for moving the deflecting element such that the planar surface thereof moved parallel to itself from a first region to a second region and from the second to the first region;

(c) first, second, and third radiation ports (e.g., P1, P2, P3; FIG. 1) that are respectively located such that when the deflecting element is in the first region a radiation signal beam arriving at the switching arrangement at the first port (P1) propagates through the location of the second position and enters into the second port (P2), and such that when the deflecting element is moved by moving means into the second region the signal beam arriving at the first port (P1) is deflected by the planar surface of the deflecting element into the third port (P3), and (d) a substrate (e.g., S; FIG. 3) having a major planar surface (e.g., PS; FIG. 3) surface and having first, second, and third waveguide alignment recesses (e.g., FR1, FR2, FR3; FIG. 3) therein at the surface thereof which determine respective first, second, and third port positions of the first, second, and third ports, respectively, and having a pair of deflecting element alignment recesses (e.g., SBR1, SBR2; FIG. 3) therein at the surface thereof for aligning the deflecting element with respect to the first, second, and third port positions.

Typically each port comprises an end of a waveguide, such as a millimeter waveguide or an optical waveguide (fiber).

In a specific embodiment, the radiation is optical, the deflecting element is a mirror, and the respective ports are respective ends of optical fibers. The mirror is held by a holder (header) which has a pair or recesses. This pair of recesses is aligned to another pair of recesses, for aligning the mirror, which have been lithographed in a silicon substrate, and each of a pair of ball-bearings fits into a respective of the pair of aligned recesses. The fibers are aligned with respect to one another and to the mirror by setting the respective fibers into respective elongated recesses for aligning optical fibers. The fibers are aligned to one another and with respect to the mirror by setting the respective fibers into respective elongated recesses, adapted for aligning optical fibers, all of which have been lithographed in the silicon substrate simultaneously with the recesses into which the ball-bearings fit. In this way, the desirable alignment precision of "silicon workbench" technology is achieved. Also, advantageously a planar reflecting surface of the mirror is constrained by the ball-bearings to move parallel to itself, so that jitter of the optical beam is avoided when the mirror stops moving during a switching operation, even if the mirror stops suddenly.

This switching arrangement can be modified in order to have an optical switching arrangement suitable for an optical fiber loop in a LAN. Specifically, to the just described arrangement there is added a fourth port in the form of a fourth optical fiber segment which is set in yet another elongated recess in the substrate. At the same time, a local optical source is located at the local station and is positioned so as to deliver a second optical signal beam to this fourth fiber segment, and a local photodetector is located at the local station and is positional so as to receive the optical beam after entering into and propagating through the third fiber segment. In this way, the optical beam arriving at the first port stems from the LAN loop, and the second optical beam arriving at the fourth port stems from the local optical source, and the switching arrangement can be used in a LAN as described above, with the added feature that when the deflecting element of a local station is in the first region (off-line) self-testing operations at that local station can be performed with a desirably lower effective optical intensity by virtue of the offset of the third and fourth fiber segments.

BRIEF DESCRIPTION OF THE DRAWING

This invention together with its features, characteristics, and advantages may be better understood from the following detailed description when read in conjunction with the drawings in which.

Only for the sake of clarity, none of the drawings is to scale.

DETAILED DESCRIPTION

Figure 1:
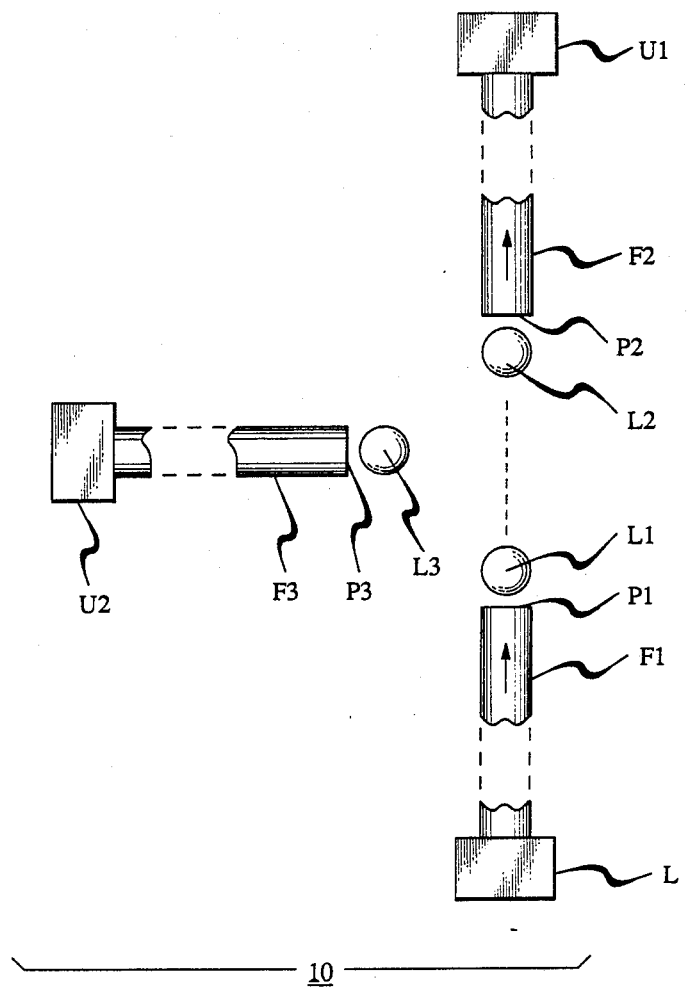
FIG. 1 is a schematic diagram of a three-port optical switching arrangement in accordance with a specific embodiment of the invention.
Figure 2:
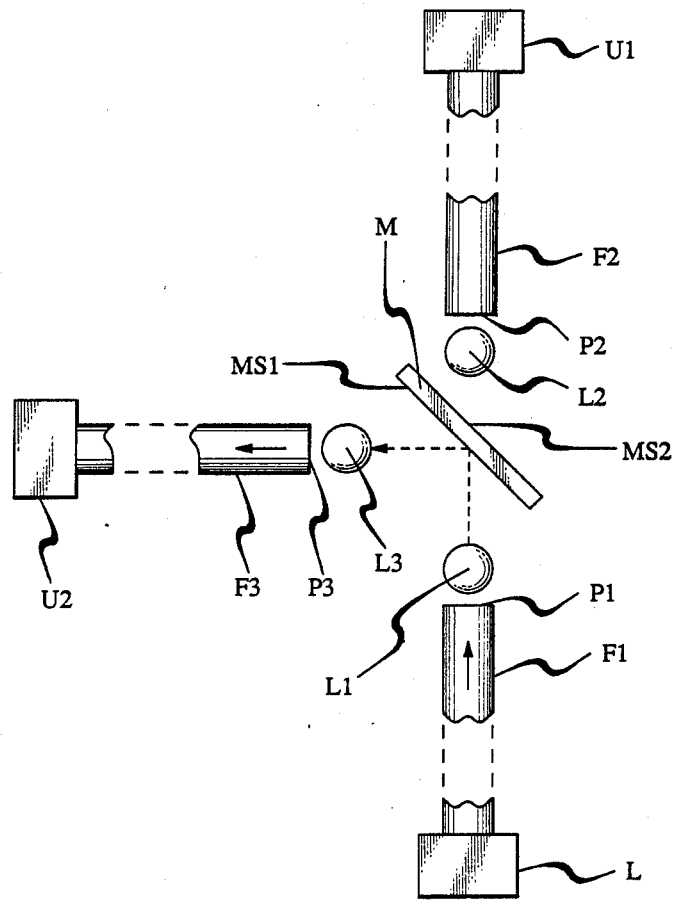
FIG. 2 is a schematic diagram of the embodiment shown in FIG. 1 with a mirror moved into the optical path.

As shown in FIGS. 1 and 2, a three-port (one input, two output) optical switching arrangement 10 (FIG. 1) or 20 (FIG. 2) has a mirror M which is positioned either out of the optical path (FIG. 1) or in the optical path (FIG. 2). In both situations (FIGS. 1 and 2), the switching arrangement 10, 20 has first, second and third optical ports P1, P2, and P3, which are formed by respective proximate ends of first, second, and third optical fiber segments F1, F2, and F3. The switching arrangement 10, 20 further comprises first, second and third lenslets L1, L2, and L3 which serve to collimate the respective optical beams emanating from the first fiber F1, entering into the second fiber F2 (FIG. 1), or entering into the third fiber F3 (FIG. 2). Optical radiation for the optical beams is supplied by a light source L and is collected by utilization means U1 (FIG. 1) or U2 (FIG. 2). The mirror M (FIG. 2) has a frontal planar reflecting surface MSI and may also have another reflecting surface parallel thereto, such as rear planar reflecting surface MS2.

Figure 3:
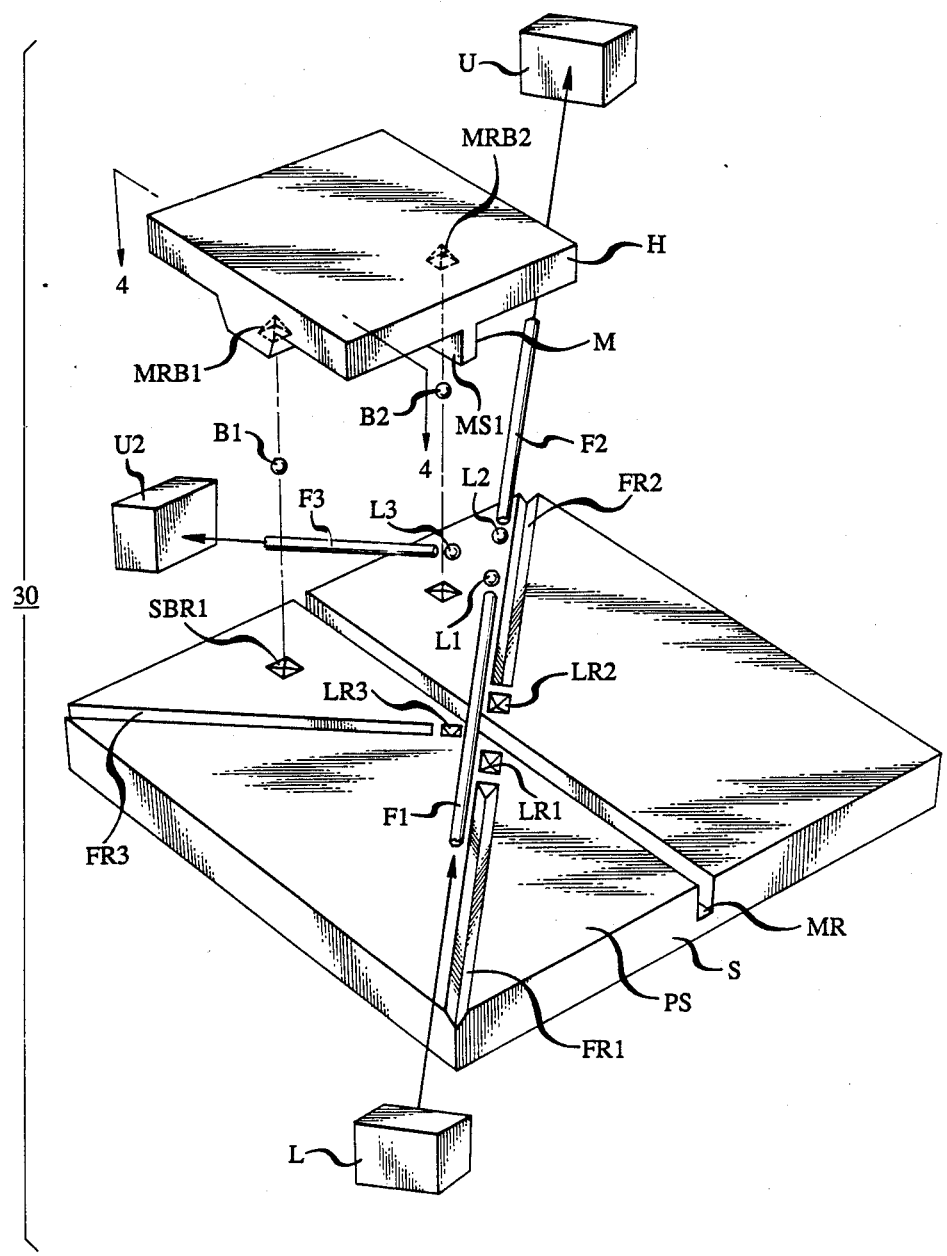
FIG. 3 is an assembly view of a switching assembly, comprising the embodiment shown in FIGS. 1 and 2, integrated in silicon workbench technology, in accordance with another specific embodiment in the invention.

The switching arrangement 10, 20 can advantageously be integrated in a silicon workbench technology assembly, to form an optical switching assembly 30 (FIG. 3). Here the same reference labels are used as were used in FIGS. 1 and 2 to refer to the same or similar elements or piece-parts.

On a major planar surface PS of a silicon substrate S, for alignment purposes there is a plurality of recesses (indentations or grooves) that are cut into the substrate S, including a mirror recess MR into which fits the mirror M. Other recesses cut into the substrate S include: first, second, and third fiber recesses FR1, FR2, FR3; first, second, and third lenslet recesses LR1, LR2, and LR3; and first and second substrate ball recesses SBR1 and SBR2 for receiving and holding in place a pair of identical ball-bearings B1 and B2. The mirror M is integral with a silicon header (holder) H. This header has a pair of mirror ball-bearing recesses MBR1 and MBR2 that are registerable with a pair of identical substrate ball-bearing recesses SBR1 and SBR2 for receiving and holding in place the ball-bearings B1 and B2. To prevent scratching of the mirror surface MS1, the mirror recess MR is made sufficiently wide to prevent the reflecting surface(s) of the mirror from touching the sides of this mirror recess MR especially when the mirror moves in and out of this recess. The mirror recess MR and the ball-bearing recesses SBR1, SBR2, MBR1, and MBR2 are all mutually located for desired mutual alignment of the mirror surface MS1, the lenslets L1, L2, and L3, and the fiber segments F1, F2, and F3.

Figure 4:
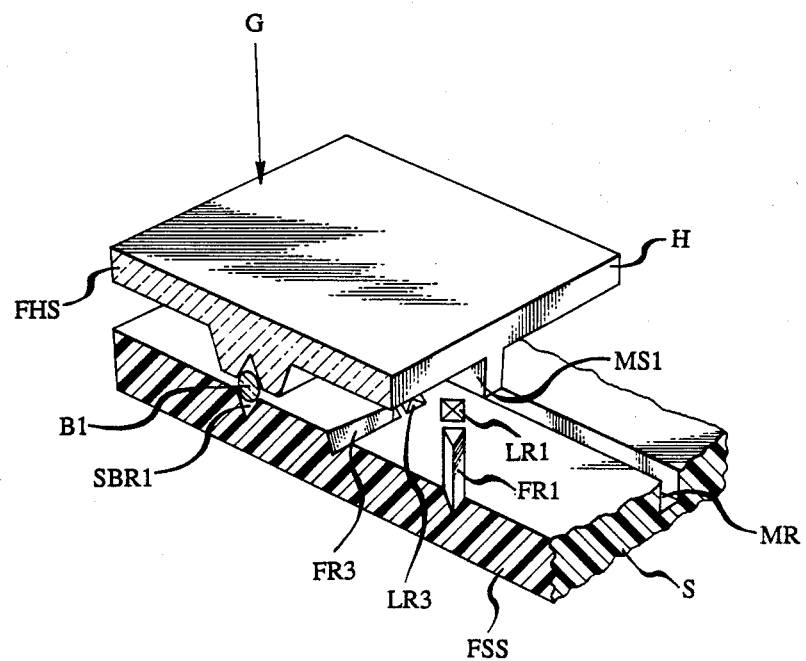
FIG. 4 is a cross section view of a portion of the embodiment shown in FIGS. 1 and 2 (with optical fibers not in place, only for the sake of clarity) in accordance with a specific embodiment of the invention.

FIG. 4 is a cross section view of the portion the header H and substrate S indicated by the line 4-4 in FIG. 3. Here in FIG. 4, the front header surface cross section FHS is typically a <110> plane of a monocrystalline silicon body of which the header H is composed, and the mirror M is an integral part of the same silicon body, as formed by known lithographic masking and anisotropic etching techniques. The front substrate surface FSS cross section of the substrate S is typically a <100> plane of a monocrystalline silicon body of which the substrate S is composed.

The header H can move in a rotary motion about the axis formed by joining the centers of the ball-bearings B1 and B2. Hence the planar surface MS1 (and MS2) of the mirror M is constrained to move parallel to itself, i.e., with no lateral displacement. Thus the right-hand edge of the mirror M (FIGS. 3 and 4) can move smoothly into an out of the mirror recess MR, depending upon a suitable force G (or distribution of forces) applied at a point (or region) at the top of the header H located to the left of the aforementioned axis through the ball-bearings B1 and B2. This force G is applied in accordance with a function of time that is suitable for the desired switching. The force G gives rise to a counterclockwise torque when G is directed downward as shown in FIG. 4, and hence tends to move the relevant part of the mirror M (where the light beam is incident) out of the optical path in the switching arrangement 10, 20; and this force G gives rise to a clockwise torque when G is directed upward (not shown), and hence tends to move the mirror M into the optical path. Thus, during switching operations, the direction of G determines the movement of the mirror M to produce the condition of the switching arrangement 10 vs. 20 (FIG. 1 vs. FIG. 2).

It should be noted that jittering (random) motion of the mirror M upward or downward does not impair optical alignment, because the alignment is completely determined by the identical ball-bearings B1 and B2 fitting into the identical recesses SBR1 and SBR2 which are located and aligned such that the mirror is constrained to move in a direction perpendicular to the place defined by the fibers F1, F2, and F3. In this way, mechanical vibrations which tend to produce relative motion between the substrate and the mirror do not adversely affect the optical transmission, because the otherwise adverse transverse relative motion is suppressed by the rigidity of ball-bearings B1 and B2 in the recesses SBR1 and SBR2.

The lenslets L1, L2, and L3 are typically made of sapphire (n=1.7) or of high index (about 1.7 to 1.9) glass. The ball bearings B1 and B2 are conveniently made of the same material as are the lenslets.

Figure 5:
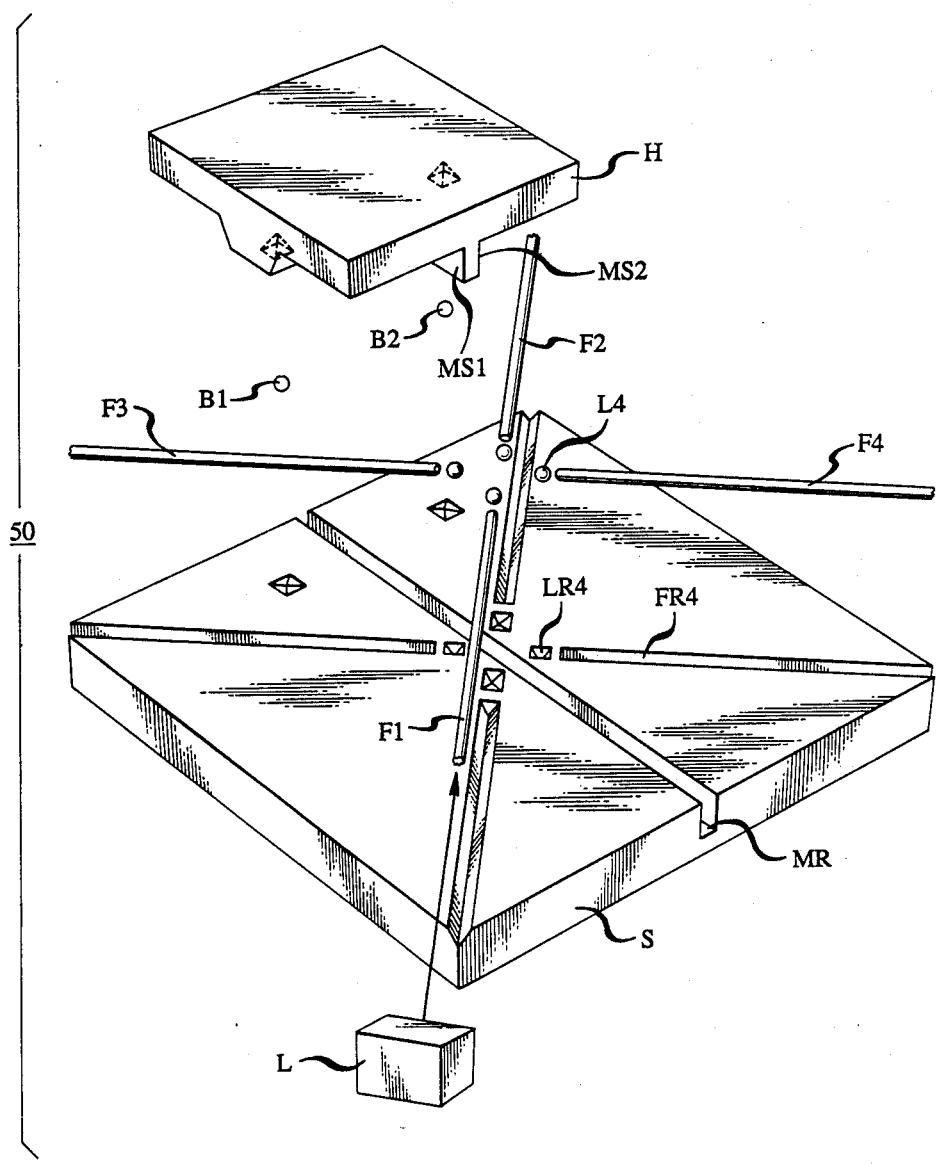
FIG. 5 is an assembly view of a four-port optical switching assembly suitable for use in a LAN, in accordance with another specific embodiment of the invention.

FIG. 5 shows an assembly view of a four-port (two input, two output) optical switching assembly 50 suitable for use in a LAN. The assembly 50 can be viewed as being derived from the previously described optical switching assembly 30 by the addition of a fourth port formed by fiber segment F4 fitting into fiber recess FR4, together with lenslet L4 fitting into lenslet recess LR4, plus a second mirror surface MS2 of the mirror M parallel to the first surface MS1.

Figure 6:
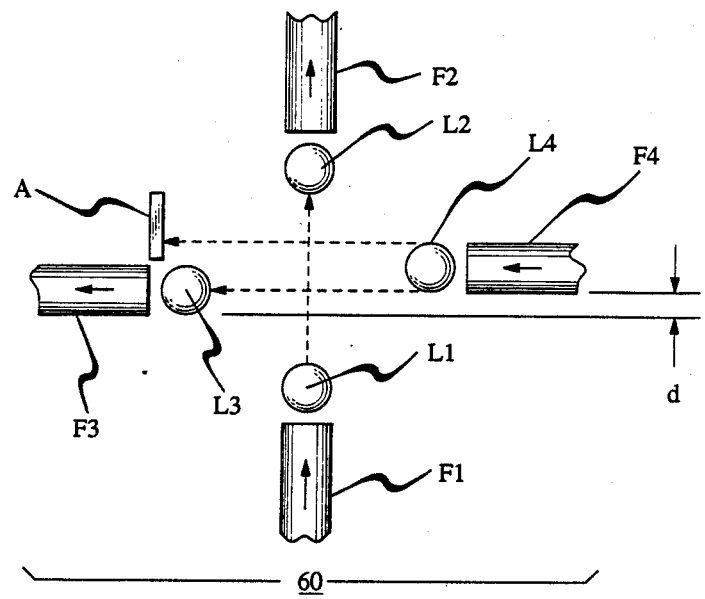
FIG. 6 is a top view of the embodiment shown in FIG. 6 with the mirror out of the optical path.

FIG. 6 shows a top view of the assembly 50 when the mirror M is out of the optical path (off-line, by-pass mode). As indicated in FIG. 6, when the mirror M is located in a position which is thus outside of the optical path, optical radiation exiting from the first fiber segment F1 then passes the switching arrangement 60 into the second fiber F2. At the same time, an optical beam propagating in the fourth fiber segment F4 from another light source (not shown) passes into the fiber segment F3 but with an attenuated optical intensity (indicated by a dotted line), owing to a deliberately selected offset distance d of fiber segment F3 relative to fiber segment F4 (together with the same offset in their respective lenslets L3 and L4). The thus attenuated beam entering into the fiber segment F3, is useful for self-testing operations as more fully described below. An absorber A can be added, if need be, to absorb the (excess) light coming from the fiber segment F4, i.e., to absorb the light which does not enter into the fiber segment F3.

Figure 7:
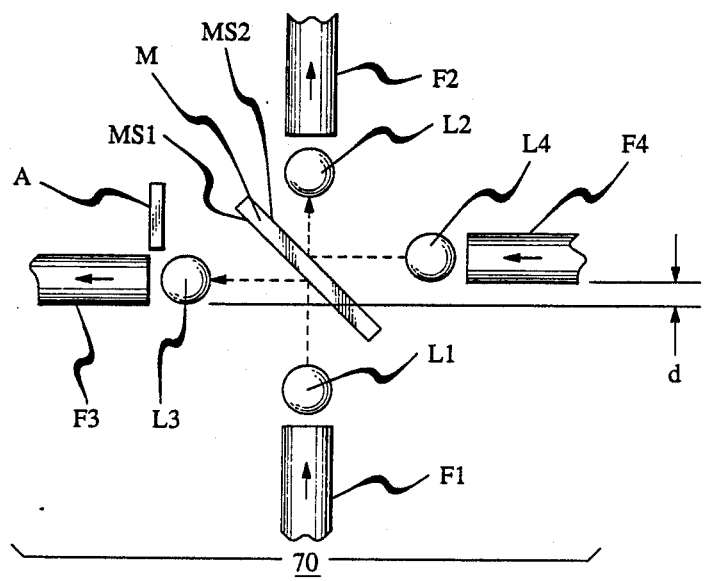
FIG. 7 is a top view of the embodiment shown in FIG. 6 with the mirror in the optical path.

FIG. 7 shows a top view of the switching assembly 50 (FIG. 5) when the mirror is in the path of the optical beam (active mode). As indicated in FIG. 7, when the mirror M is thus moved into the optical path, the optical beam exiting from the fiber segment F1 is passed into the switching arrangement 70 where it is reflected by the first surface MS1 of the mirror M and directed into the third fiber segment F3. At the same time, light exiting from the fiber segment F4 is reflected by the second surface MS2 of the mirror M and enters into the fiber segment F2. By making the thickness (distance between frontside and backside) of the mirror M equal to $d/\sqrt{2}$ ($=d \cos 45°$), if the arrangement 60 is aligned properly, so also will the arrangement 70 be aligned properly. In particular, in FIG. 6 substantially all of the beam exiting from F1 will enter into F2, and only a portion of the cross section of the beam exiting from F4 will enter into F3; whereas in FIG. 7 substantially all of the beam exiting from F1 will enter with F3; and substantially all of the beam exiting from F4 will enter into F2.

Figure 8:
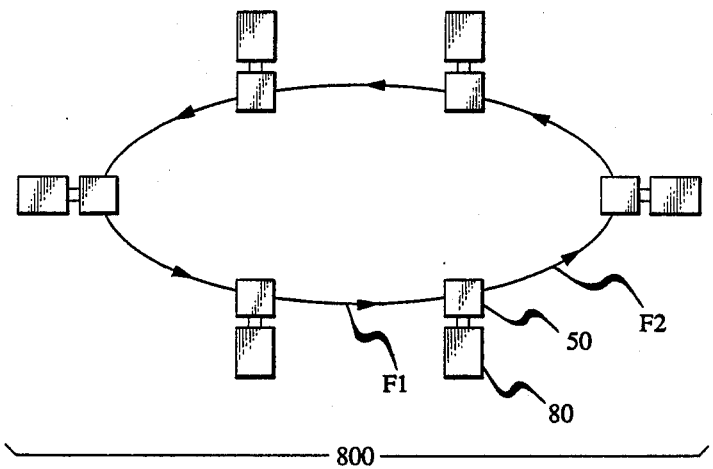
FIG. 8 is a diagram of a LAN in accordance with another embodiment of the invention.

FIG. 8 shows a LAN loop 800 composed of a plurality of similar local stations exemplified by a typical local station composed of node 80 together with the four-port optical switching assembly 50 described above. For example, there are a total of six such local stations interconnected by six fiber segments. One of the stations may typically function as a main station, but in any event it operates in similar manner as the others insofar as relevant here.

Figure 9:
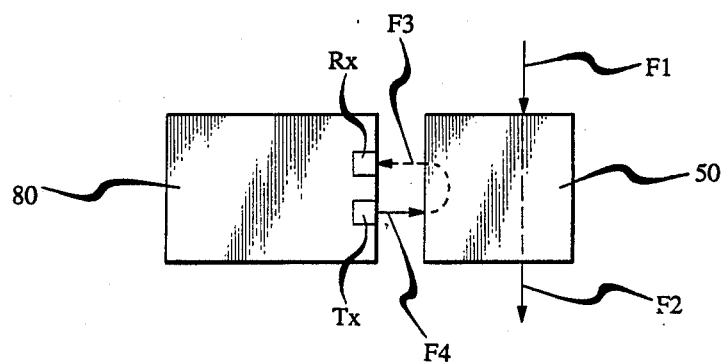
FIG. 9 is a diagram of a typical local station which is off-line in the LAN shown in FIG. 8.

FIG. 9 shows a typical local station which is in the off-line condition (by-pass mode). As indicated in FIG. 9, when the mirror (not shown) in the switching assembly 50 is not in the optical path, a transmitter Tx, such as a light emitting diode (LED), sends a light beam into fiber segment F4 which is partially propagated by the switching assembly 50 (as per FIG. 6) into fiber segment F3 and ultimately to a utilization means, such as a PIN photodiode receiver Rx, whereas optical radiation propagating through fiber segment F1 passes through the switch 50 undisturbed and enters into the fiber segment F2. The beam thus propagating from F1 to F2 goes on to the next local station, whereas the beam propagating from F4 to F3 can be used for testing the photo-electronics of the node 80. Thus the situation of the node 80 in FIG. 9 is the off-line (by-pass) mode.

Figure 10:
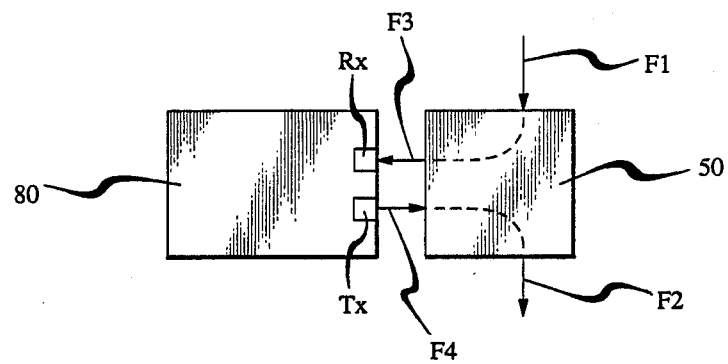
FIG. 10 is a diagram of a typical local station which is on-line in the LAN shown in FIG. 8.

FIG. 10 shows the typical local station in its on-line condition (active mode), i.e., with the mirror in the optical path. As indicated in FIG. 10, when the mirror M (not shown) is moved into the optical path, the optical beam emanating from fiber segment F1 enters into the receiver Rx, whereas the optical beam emanating from the transmitter Tx enters into the fiber segment F2. Thus, the situation depicted in FIG. 10 is the on-line mode of the node 80, wherein the electronics of the node 80 utilizes and processes the information on the beam emanating from the fiber segment F1, and in response thereto the node 80 then transmits its own processed information to the fiber segment F4.

Figure 11:
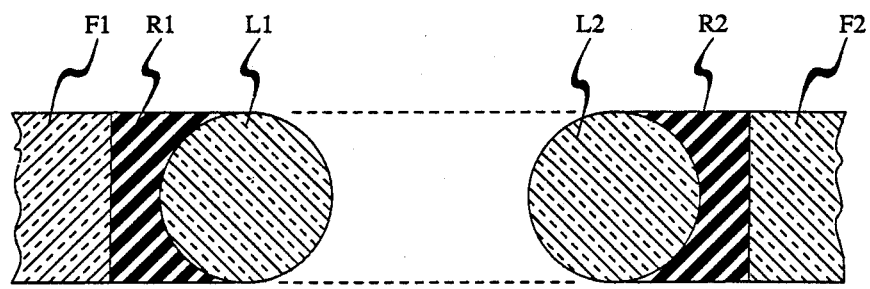
FIG. 11 is a cross-section diagram of an optical coupler in accordance with another embodiment of the invention.

FIG. 11 is a design of an optical coupling arrangement, for coupling together a pair of fiber segments, such as F1 and F2, to their respective lenslets L1 and L2 in the above-described switching arrangements. More specifically, for example, the space between the fiber segment F1 and its lenslet L1 is filled with a transparent medium R1, such as silicone rubber, having a refractive index which is approximately equal to that of the segment F1, typically about 1.5. In this way, unwanted reflections at the interface of F1 with R1 are avoided. At the same time the more desirable collimated beam optics (parallel beam between L1 and L2) is achieved rather than converging beam optics (rays coming to a focus between L1 and L2). Similarly, the space between L2 and F2 is filled with a similar transparent medium R2.

Note that in FIGS. 6 and 7, the offset distance d arises in the switching assembly 60 because of the non-vanishing thickness of the mirror M. This offset causes optical loss into the absorber A, which can be undesirable in cases where the redirection of optical intensity, as is desired in self-testing, is not desired. To avoid this possibly undesirable situation, the optics of the assembly can be modified, for example, as shown in FIGS. 12-13 or 14 or 15-16 or 17-18 or 19-20. In all these FIGURES, the same reference labels are used to denote elements that are similar to those described above. In particular, all the lenslets are set in respective recesses in the substrate S (FIG. 5) as are the associated fibers, the recesses being located at respective positions that are determined by silicon workbench technology.

Figure 12:
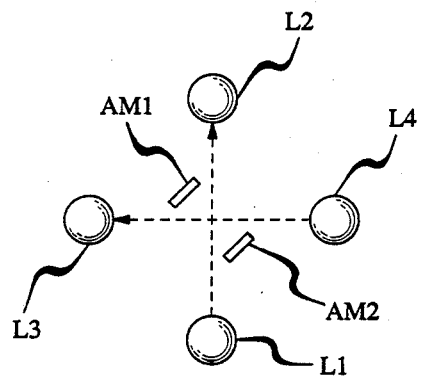
FIGS. 12-13 are top views a part of a four-port optical switching assembly, in accordance with yet another specific embodiment of the invention.
Figure 13:
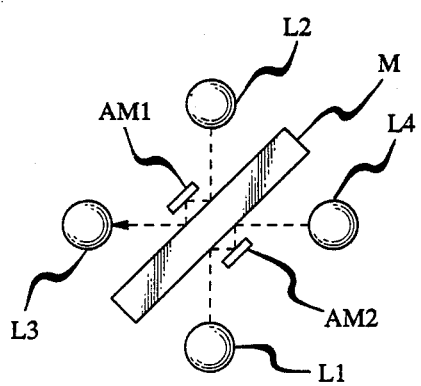

FIGS. 12-13 depict the lenslets L1, L2, L3, and L4 in a configuration for use in a switching assembly of the kind described above (FIG. 5). The remainder of the assembly (not shown in FIGS. 12-13) should be understood to be the same as the switching assembly 50 shown in FIG. 5. Here in FIGS. 12-13, a pair of auxiliary mirrors AM1 and AM2 are fixedly attached either to the substrate S (FIG. 5) or to the header H and are oriented parallel to the mirror M, whereby the optical path between the fibers F4 and F3 does not suffer from any offset, as is desired.

Figure 14:
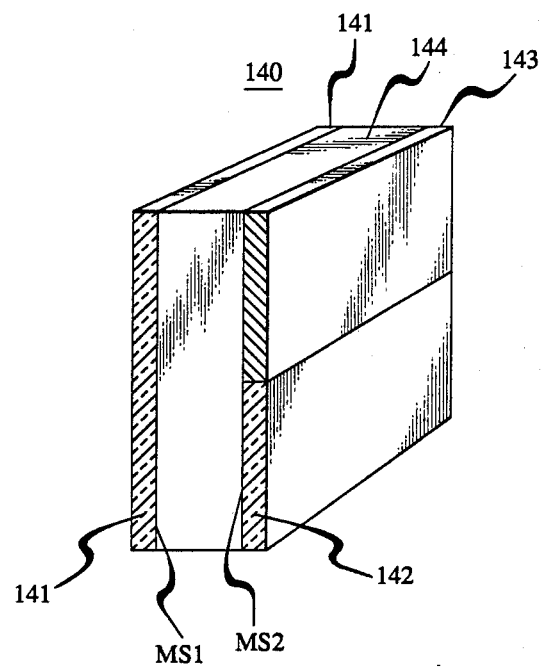
FIG. 14 is a perspective view, partially in cross section, of a mirror suitable for use in a four-port optical switching assembly, in accordance with still another specific embodiment.

FIG. 14 depicts a mirror 140 which, when used as the mirror M attached to the header H in the switching assembly 50 (FIG. 5), likewise avoids the offset. Here in FIG. 14, the mirror 140 includes a silicon parallel slab 144 having its front surface MS1 coated with a thin layer 141 made of suitable transparent material, typically silicon dioxide, having a thickness such that it acts as an anti-reflection coating. The bottom half of the rear surface MS2 of the slab 144 is likewise coated with a similarly thin layer 142 of the transparent material, whereas the top half of the rear surface MS2 is coated with a thin reflecting layer 143, made of suitable optically reflecting material, such as a metal having a thickness of about 100 nm. This mirror 140 can then be used in the switching assembly 50 in the following manner. To put the assembly with the mirror 140 into the by-pass mode depicted in FIG. 6, the mirror 140 is moved upward into a position such that the optical paths among the lenslets pass through bottom (transparent) half of the mirror 140. In this way, the dielectric portion of merely the mirror deflects (refracts) the beam slightly and directs the beam along the appropriate optical path. To achieve the active mode (FIG. 7), the mirror 140 is moved downward such that the optical paths pass through the top (reflecting) half of the mirror 140—while the bottom half of the mirror is situated in the mirror recess MR (FIG. 5). In this way the mirror 140 reflects the optical beams incident upon the front and rear surfaces of the reflecting layer 142, which has negligible thickness and hence introduces negligible offset.

Figure 15:
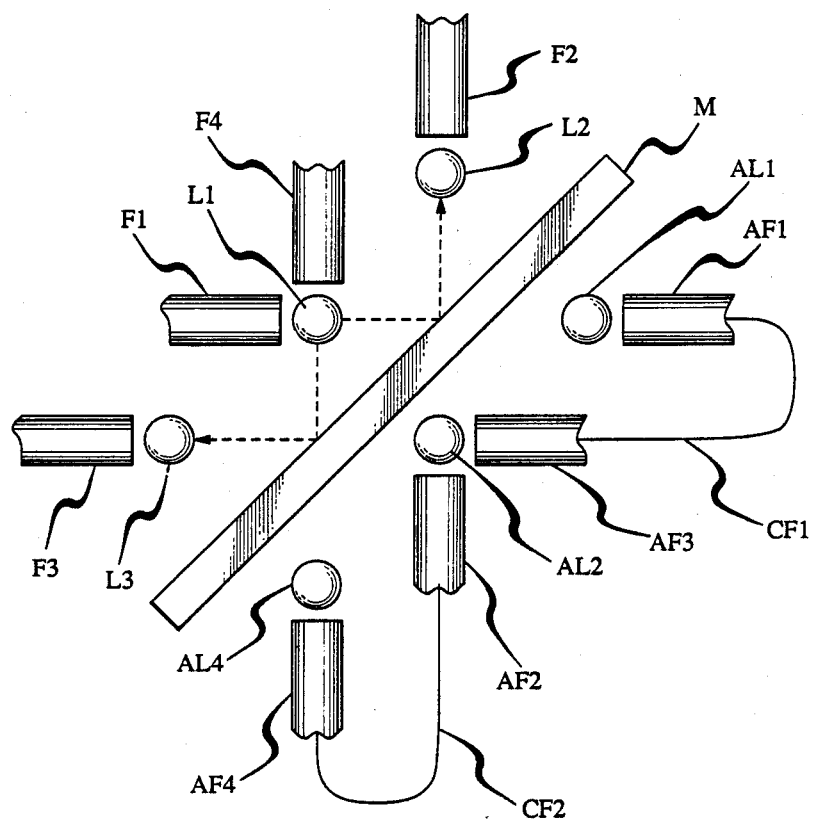
FIGS. 15-16 are top views of a four-port optical switching assembly, in accordance with yet another specific embodiment of the invention.
Figure 16:
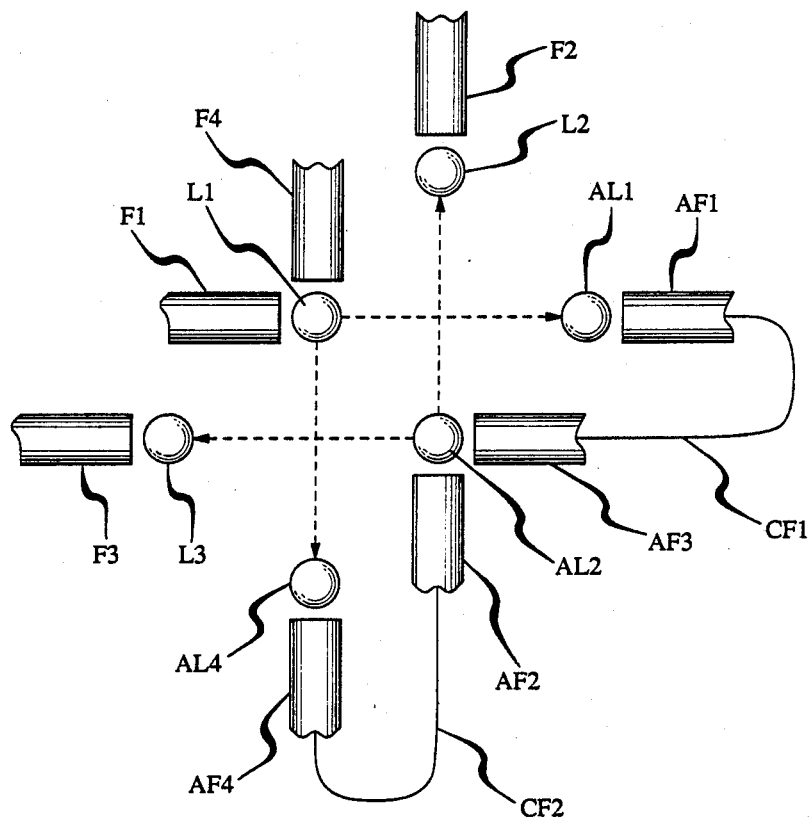

FIGS. 15-16 depict an arrangement of lenslets and fibers to avoid the offset, in accordance with yet another embodiment. Here in FIGS. 15-16, the fibers F1, F2, F3, and F4 serve the same respective functions as in FIGS. 6-7, but they are all located on the same (front) side of mirror M. On the other (rear) side of the mirror M, auxiliary fibers AF1, AF2, and AF3—together with auxiliary lenslets AL1, AL2, and AL3—are located (FIG. 16) in respective alignment with these fibers F1, F2, and F3. Note that only three main lenslets L1, L2, and L3 are required, the lenslet L1 doing double duty by passing two mutually orthogonal beams simultaneously. The auxiliary fiber AF1 is connected at its rear end by a connecting fiber CF1 to the rear end of the auxiliary fiber AF3, and the auxiliary fiber AF2 is connected at its rear end by a connecting fiber CF4 to the rear end of the auxiliary fiber AF4. In this way, when the mirror M is moved into a position located in the paths of the optical beams, as shown in FIG. 15, the by-pass (off-line) mode is obtained. In particular, light exiting from F1 goes to F2 by way of path through L1, reflection by mirror M, and through L2; and light exiting from F4 goes to F3 by way of a path through L1, reflection by mirror M, and through L3. And when the mirror M is moved into a position located outside of the paths of the optical beams, as shown in FIG. 16, the active (on-line) mode is achieved. That is, light exiting from F1 goes to F3 via L1, AL1, AF1, CF1, AF3, AL2, and L3; and light exiting from F4 goes to F2 via L1, AL4, AF4, CF2, AF2, AL2, and L2.

It should be understood that the location of all the lenslets and fibers shown in FIGS. 15-16 again are determined by recesses in the substrate S (FIG. 5), advantageously in accordance with silicon workbench technology, and that the position of the mirror M in FIGS. 15-16 is determined by ball-bearings (not shown in FIGS. 15-16) located in recesses, i.e., in the same way as the position of the mirror M in FIG. 5.

It should also be understood that in FIGS. 15-16 the positions of the fibers F2 and F3 can be interchanged, and at the same time the respective lenslets L2 and L3 are interchanged. In that case, the active (on-line) mode is obtained in the configuration shown in FIG. 15, whereas the by-pass (off-line) mode is obtained in the configuration shown in FIG. 16.

Figure 17:
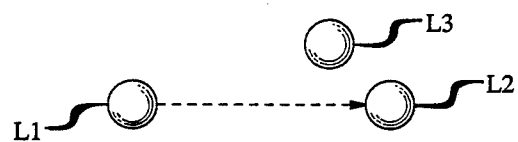
FIGS. 17-18 are top views of part of a three-port optical switching assembly, in accordance with still another specific embodiment of the invention.
Figure 18:
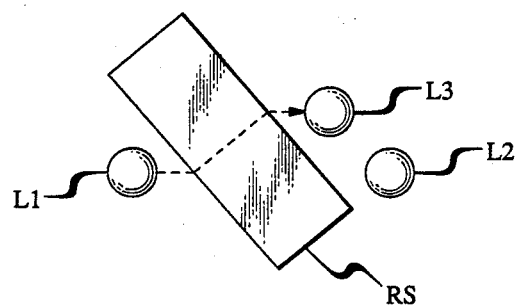
Figure 19:
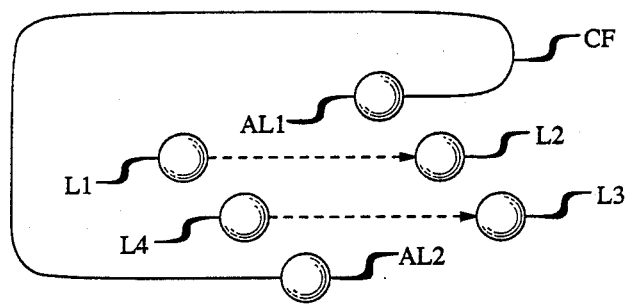
FIGS. 19-20 are top views of part of a four-port optical switching assembly, in accordance with still another specific embodiment of the invention.
Figure 20:
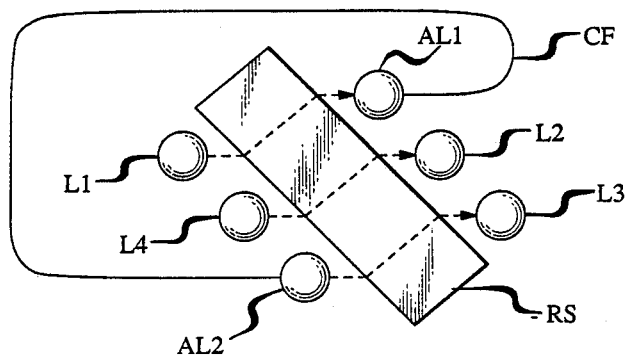
Figure 3:
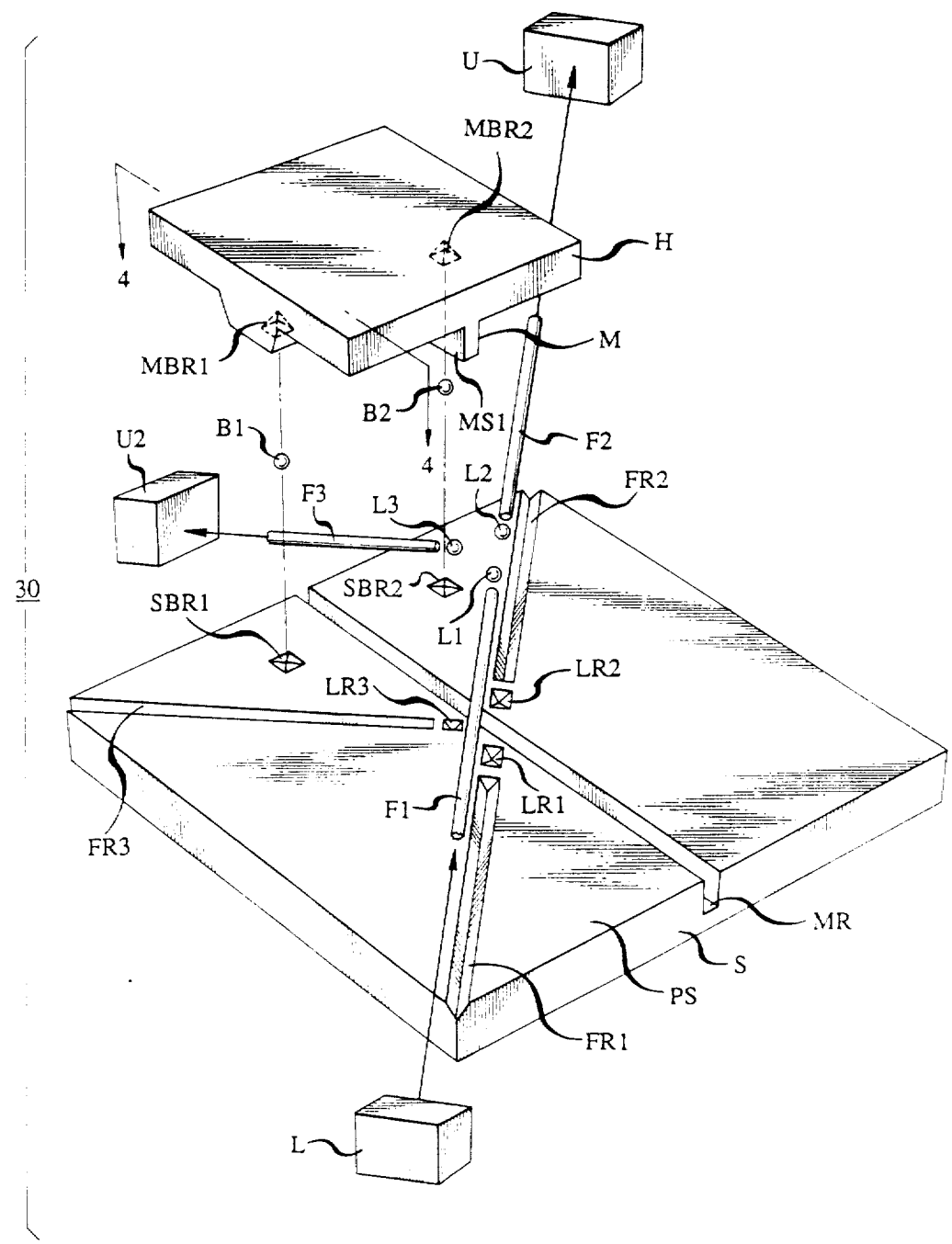

Instead of the reflecting mirror M, an optically refracting element can be used, for example, in the form of a parallel refracting slab (plate) RS, i.e., a parallel plate composed of an optically refracting medium—as illustrated, for example, in the three-port configuration shown in FIGS. 17-18 (fibers F1, F2, F3 not shown) and in the four-port configuration shown in FIGS. 19-20 (fibers F1, F2, F3, F4 not shown). It should be understood here that optical fibers (not shown in FIGS. 17-18 or FIGS. 19-20) should be aligned as shown in FIGS. 3 and 5. In particular (FIGS. 17-18), refracting slab RS is designed—for example, as to thickness and refractive index—such that, when it is moved into the optical path as constrained by ball-bearings B1 and B2 in their respective recesses (FIG. 4), it refracts the optical beam by an amount sufficient to deliver the beam to a different lenslet—e.g., to the lenslet L3 (FIG. 18) instead of L2 (FIG. 17). Note that the front and rear planar surfaces of the refracting slab RS are both constrained to move parallel to themselves, respectively.

In FIG. 20, AL1 and AL2 are auxiliary lenslets connected by a connecting fiber CF, whereby the arrangement (FIGS. 19-20) can be used in a four-port optical switching assembly similar to the one depicted in FIG. 6-7.

Notice that in connection with all cases described above, the position and orientation of the mirror M or 140 (FIG. 14), or of the parallel refracting slab RS (FIG. 18), is determined by the positions of ball-bearings B1 and B2 which fit into the recesses SBR1 and SBR2. These positions of these ball-bearings in these recesses reliably determine an axis around which the mirror M rotates in response to the applied force(s) G indicated in FIG. 4. The silicon workbench technology, in which the recesses for the mirror, ball-bearings, fibers, and lenslets are all simultaneously formed by reliable lithography, ensures precise relative alignment of all fibers, lenslets, and the mirror on a mass productive basis—i.e., the simultaneous manufacture of a plurality of substrates with all their recesses aligned by means of conventional lithographic techniques. Likewise it should be understood that the position and orientation of the refracting slab RS (FIGS. 18 and 20) is similarly determined by ball bearings (not shown) which fit into recesses in the substrate S as depicted in FIGS. 3-5, for example.

Although the invention has been described in detail in terms of specific embodiments, various modifications can be made without departing from the scope of the invention. For example, the lenslets can be omitted by making the edges of the fiber segments spherical, rather than flat, to collimate the exiting optical beam. Also, a single mirror M or refracting slab RS can simultaneously be used in conjuction with more than the single set of three (or four) ports—i.e., with an array of fibers containing a plurality of sets of such fibers, each set comprising three (or four) fibers operating similarly to F1, F2, F3 (and F4).

Instead of offsetting (FIGS. 6 and 7) the fiber segments F3 and F4 (together with lenslets L3 and F4) by the distance d, the (center of the) mirror could be offset, in order to reduce the amount of optical radiation entering into the fiber segment F3 from the fiber segment F4 during the off-line mode.

At some sacrifice of long-term stability, reliability, and optical insertion loss, the header H can be a stamped metal or molded plastic body having projections that fit into recesses in the silicon substrate, while the ball-bearings are omitted.

Instead of optical signals, other forms of electromagnetic radiation signals can be used, spanning from optical to millimeter waves with appropriate changes in the materials of the lenslets, mirror, and waveguides.

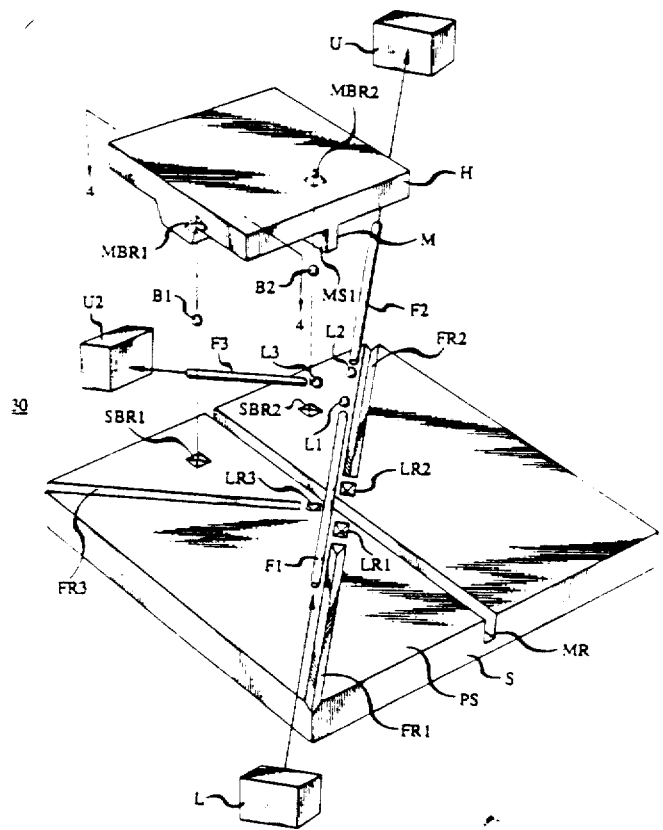

I claim:

1. An electromagnetic radiation switching arrangement which comprises:
   (a) a radiation deflecting element (e.g., M, FIG. 2; RS, FIG. 18) having a planar deflecting surface;
   (b) moving means (e.g., G; FIG. 4) for moving the deflecting element such that the planar deflecting surface thereof can be moved parallel to itself from a first region to a second region and from the second to the first region;
   (c) first, second, and third radiation ports (e.g., P1, P2, P3; FIG. 1) that are respectively located such that when the deflecting element is in the first region a radiation signal beam arriving at the switching arrangement at the first port (P1) propagates through the location of the second position and enters into the second port (P2), and such that when the deflecting element is moved by the moving means into the second region the signal beam arriving at the first port (P1) is deflected by the planar surface of the deflecting element into the third port (P3), and
   (d) a substrate (e.g., S; FIG. 3) having a major planar surface (e.g., PS, FIG. 3) surface and having first, second, and third waveguide alignment recesses (e.g., FR1, FR2, FR3; FIG. 3) therein at the surface thereof which determine respective first, second, and third port positions of the first, second, and third ports, respectively, and having a pair of deflecting element alignment recesses (e.g., SBR1, SBR2; FIG. 3) therein at the surface thereof for aligning the deflecting element with respect to the first, second, and third port positions.

2. The arrangement of claim 1 in which the electromagnetic radiation is optical radiation in which the radiation signal beam is a first optical beam, in which the first, second, and third waveguide alignment recesses are elongated fiber alignment recesses, and in which the first, second, and third ports comprise, respectively, first, second, and third optical fiber segments which are set in the first, second, and third elongated recesses, respectively, the first, second, and third elongated recesses having respectively first, second, and third axes that are mutually oriented for propagation of the first optical beam emanating from the first fiber segment to the second and third fiber segments.

3. The arrangement of claim 2 further including a fourth optical port comprising a fourth fiber segment set in a fourth elongated waveguide alignment recess in the substrate, the fourth elongated waveguide alignment recess having an axis which is aligned such that when the deflecting element is situated in the first region a second optical signal beam, supplied by a local optical source and arriving at the fourth port, propagates through the second region and enters into the third port, and when the deflecting element is moved to the second region the second optical beam is deflected by the deflecting element and enters into the second port.

4. The arrangement of claim 3 further including a photodetector which is positioned to receive an optical beam after entering into and propagating through the third fiber segment, in which the deflecting element is a mirror having frontside and backside planes that are spaced apart by a first distance, and in which the fourth recess is set with an offset distance with respect to the third recess such that when the mirror is situated in the first region only a part of the cross section of the second optical beam arriving at the fourth port enters into the third fiber segment and when the mirror is moved into the second region substantially all of the cross section of the optical beam arriving at the fourth port enters into the second fiber segment.

5. The arrangement of claim 4 further comprising fifth, sixth, seventh, and eighth recesses in the surface of the substrate having first, second, third and fourth optical lenses, respectively, set therein at respective locations that are aligned with respect to the first, second, third, and fourth ports, respectively.

6. The arrangement of claim 3 further comprising fifth, sixth, seventh, and eighth recesses in the surface of the substrate having first, second, third and fourth optical lenses, respectively, set therein at respective locations that are aligned with respect to the first, second, third, and fourth ports, respectively.

7. The arrangement of claim 3 further comprising fourth, fifth, and sixth recesses in the surface of the substrate having first, second, and third optical lenses, respectively, set therein at respective locations that are aligned with respect to the first, second, and third ports, respectively.

8. The arrangement of claim 2 in which the electromagnetic radiation is optical radiation and which further comprises fourth, fifth, and sixth recesses in the surface of the substrate having first, second, and third optical lenses, respectively, set therein at respective locations that are aligned with respect to the first, second, and third ports, respectively.

9. The arrangement of claim 1 further comprising fourth, fifth, and sixth recesses in the surface of the substrate having first, second, and third optical lenses, respectively, set therein at respective locations that are aligned with respect to the first, second, and third ports, respectively.

10. The arrangement of claim 1 in which the means for moving the mirror urges motion in a first direction that is parallel to the frontside plane and in which the first direction is perpendicular to a plane determined by the optical beams.

11. A communication system including the arrangement recited in claim 1 and further including
   (a) utilization means for utilization optical radiation, and
   (b) optical transmission means for gathering the optical beam entering into the second port and propagating it to the utilization means.

12. A communication system including the switching arrangement recited in claim 2 and further including:
   utilization means for utilizing optical radiation emanating from the second fiber segment after propagating therethrough.

13. A communication system including the switching arrangement recited in claim 4 and further including:
   utilization means for utilizing optical signals emanating from the second fiber segment after propagating therethrough.

14. The system of claim 1 in which the deflecting element is a mirror.

15. The system of claim 2 in which the deflecting element is a mirror.

16. The system of claim 4 in which the deflecting element is a mirror.

17. The system of claim 1 in which the deflecting element is a parallel plate refracting element.

18. The system of claim 2 in which the deflecting element is a parallel plate refracting element.

19. The system of claim 4 in which the deflecting element is a parallel plate refracting element.

* * * * *

UNITED STATES PATENT AND TRADEMARK OFFICE
CERTIFICATE OF CORRECTION

PATENT NO. : 4,932,745  
DATED : June 12, 1990  
INVENTOR(S) : G. E. Blonder

Page 1 of 3

It is certified that error appears in the above-identified patent and that said Letters Patent is hereby corrected as shown below:

The title page showing the illustrative figure should be deleted to appear as per attached title page.

In the drawings, sheet 3 of 14 should be deleted and replaced with the sheet of drawing attached.

Signed and Sealed this

Fifteenth Day of October, 1991

Attest:

HARRY F. MANBECK, JR.

*Attesting Officer*  *Commissioner of Patents and Trademarks*

United States Patent [19]

Blonder

[11] Patent Number: 4,932,745
[45] Date of Patent: Jun. 12, 1990

[54] RADIATION SWITCHING ARRANGEMENT WITH MOVING DEFLECTING ELEMENT

[75] Inventor: Greg E. Blonder, Summit, N.J.

[73] Assignee: AT&T Bell Laboratories, Murray Hill, N.J.

[21] Appl. No.: 385,331

[22] Filed: Jul. 25, 1989

[51] Int. Cl.⁵ .............................................. G02B 6/36
[52] U.S. Cl. ............................. 350/96.20; 350/96.16; 350/96.18
[58] Field of Search ............... 350/96.15, 96.16, 96.18, 350/96.20, 96.21, 96.22

[56] References Cited

U.S. PATENT DOCUMENTS

| | | | |
|---|---|---|---|
| 3,870,396 | 3/1975 | Racki et al. | 350/96.16 |
| 3,874,779 | 4/1975 | Thiel | 350/96.16 |
| 4,239,331 | 12/1980 | Aoyama | 350/96.20 |
| 4,497,536 | 2/1985 | Payne et al. | 350/96.18 X |
| 4,580,873 | 4/1986 | Levinson | 350/96.20 |
| 4,789,228 | 12/1988 | Le Pesant et al. | 350/96.2 D X |

OTHER PUBLICATIONS

*Optics Letters*, vol. 4, No. 1, Jan. 1979, "Optical Switch For Multimode Optical-Fiber Systems", by Masahiro Nunoshita, Yoshinori Nomura, Teruhito Matsui and Takashi Nakayama, pp. 27-28.

*Electro-Optic Products*-Siecor Corporation, Application Note 102, "Moving Fiber" Switches Permit Greater System Predictability and Reliability, 7 pages, no date.

*Primary Examiner*—John D. Lee
*Attorney, Agent, or Firm*—David I. Caplan

[57] ABSTRACT

A three or four-port electromagnetic radiation signal beam switching arrangement, such as for simple optical re-routing or for Local Area Network (LAN) loop switching, is achieved with a moving deflecting element having a planar deflecting surface that is constrained to move parallel to itself, into and out of the signal beam. The arrangement can be fabricated in a silicon optical workbench technology.

19 Claims, 14 Drawing Sheets